(12) United States Patent
Kushita

(10) Patent No.: US 6,792,294 B1
(45) Date of Patent: Sep. 14, 2004

(54) INCOMING NOTIFICATION PATTERN SETTING CIRCUIT AND METHOD OF PORTABLE TELEPHONE

(75) Inventor: Masayuki Kushita, Tokyo (JP)

(73) Assignee: NEC Corporation (JP)

( * ) Notice: Subject to any disclaimer, the term of this patent is extended or adjusted under 35 U.S.C. 154(b) by 471 days.

(21) Appl. No.: 09/716,652

(22) Filed: Nov. 20, 2000

(30) Foreign Application Priority Data

Nov. 26, 1999 (JP) ............................................ 11-336727

(51) Int. Cl.$^7$ ................................................ H04M 1/00
(52) U.S. Cl. .................... 455/566; 455/567; 455/575.1; 455/550; 340/10.6; 340/815.45; 340/815.69
(58) Field of Search ................................ 455/566, 575, 455/550, 575.1, 567, 419, 420; 379/354, 396; 340/7.5, 815.45, 815.69

(56) References Cited

U.S. PATENT DOCUMENTS

| | | | |
|---|---|---|---|
| 4,845,745 A | * 7/1989 | Havel | 379/354 |
| 4,975,694 A | * 12/1990 | McLaughlin et al. | 340/7.55 |
| 5,070,521 A | * 12/1991 | Warner et al. | 455/415 |
| 5,946,636 A | 8/1999 | Uyeno et al. | |
| 6,438,390 B1 | * 8/2002 | Awan | 455/566 |
| 6,496,709 B2 | * 12/2002 | Murray | 455/569.1 |

FOREIGN PATENT DOCUMENTS

| | | |
|---|---|---|
| JP | 9-312684 | 12/1997 |
| JP | 10-98751 | 4/1998 |
| JP | 11103334 | 4/1999 |
| JP | 11-205432 | 7/1999 |

OTHER PUBLICATIONS

European Search Report dated Feb. 20, 2003.

Japanese Office Action issued Aug. 27, 2002 (w/English translation of relevant portion).

* cited by examiner

*Primary Examiner*—Nay Maung
*Assistant Examiner*—Alan Gantt
(74) *Attorney, Agent, or Firm*—Dickstein, Shapiro, Morin & Oshinsky, LLP.

(57) ABSTRACT

It is constructed so that combinations of display colors or lighting patterns can be set from the outside by incoming notification means by light of a portable telephone apparatus. That is, incoming notification pattern data by a change in lighting colors and data of the tempo are stored in RAM 3, and data from the RAM 3 is held in an FIFO 8 and is outputted every tempo according to a read signal from an FIFO read signal generator 9, and also by generating an interruption at the time when a predetermined amount of data is outputted, a CPU 1 writes subsequent data from the RAM 3 to the FIFO 8 according to the interruption. Then, data read from the FIFO 8 is once held in an output port register 5 and an LED driver 6 independently drives plural LEDs according to data outputted from the output port register 5. In this case, it is constructed so that the data from the RAM 3 can be set from the outside.

21 Claims, 10 Drawing Sheets

Tmp=120,
Dat=1, 7, 3, 5, ········,
4, 2, 6

Fig. 4

INCOMING NOTIFICATION PATTERN SETTING CIRCUIT AND METHOD OF PORTABLE TELEPHONE

CROSS REFERENCE TO RELATED APPLICATIONS

The present invention claims priority from Japanese Patent Application No. 11-336727 filed Nov. 26, 1999, the contents of which are incorporated herein by reference.

BACKGROUND OF THE INVENTION

1. Field of the Invention

This invention relates to an incoming notification pattern setting circuit and method of a portable telephone constructed so that a user can provide incoming notification by various lighting color patterns in a portable telephone apparatus.

2. Description of Related Art

In a portable telephone apparatus, it is necessary to notify a user that incoming has occurred, and for that purpose, incoming notification means constructed so that the user recognizes the incoming through senses of sight, hearing, tough (vibration), etc. is provided.

As functions of the incoming notification means of a portable telephone, the ability to perform incoming notification by characteristic patterns for the purpose of differentiating among other users in the incoming notification to express originality other than the purpose of recognizing an originator has been required.

As such incoming notification means, in recent years, the incoming notification means providing a function of creating a ringing tone (melody) on user's own to set it as one method of expressing originality as well as recognizing an originator has become the mainstream, but the incoming notification by the ringing tone is not necessarily a preferable method since surrounding people may feel like noise and be troubled. Incidentally, the function may make the setting every partner registered in a telephone book.

As means capable of avoiding such a problem, incoming notification means by a method of expression except a tone has been desired, and a method constructed so that color or display patterns of a light emitting diode (LED) for incoming notification or vibration patterns of a vibrator for incoming notification can be set by selecting the pattern from several kinds of patterns previously prepared within the portable telephone apparatus has been known conventionally.

An incoming notification pattern setting technique of a conventional portable telephone will be described below.

FIG. 9 is a block diagram showing a configuration example of a portable telephone apparatus capable of setting incoming notification patterns to which the conventional art and the present invention are applied, and FIG. 10 is a block diagram showing a configuration example of an incoming notification pattern setting circuit of a conventional portable telephone.

As shown in FIG. 9, the portable telephone apparatus capable of setting incoming notification patterns generally comprises an antenna 101, a wireless send/receive part 102, a signal processing part 103, a notification device driving part 104, and a control part 105.

The antenna 101 sends and receives wireless signals (radio waves) between the antenna and a base station (not shown). The wireless send/receive part 102 receives a phase-modulated high-frequency signal from the base station received through the antenna 101 to demodulate the signal and reproduces audio signals or control data, and also generates a phase-modulated wave by audio signals from the signal processing part 103 or control data from the control part 105 to amplify the wave and sends out it to the antenna 101. The signal processing part 103 comprises a digital signal processor (DSP) etc. and performs processing of compressing audio signals inputted from a microphone 111 and outputting the signals to the wireless send/receive part 102 and performs processing of expanding the received audio signals and outputting the signals to a receiver 112. The notification device driving part 104, which is a member for driving various equipment for incoming notification, provides incoming notification by sound using a sounder 121 and provides incoming notification by light using an LED 122 and provides incoming notification by vibration using a vibrator 123.

The control part 105, which is a member for performing control of each part of the apparatus, detects a call number to a local apparatus from data of a predetermined position in a demodulation signal of the wireless send/receive part 102 and provides incoming notification in the notification device driving part 104 by matching the call number with the number of the local apparatus held in ID memory 131, and also implements processing of data for control to be sent and received, mail send/receive processing and a server connection function. Also, the control part 105 has read only memory (ROM) 132 for storing operational programs of a central processing unit (CPU) within the control part 105 and fixed data, and random access memory (RAM) 133 for holding temporary data in the case of operation of the CPU. A key input part 134 is used for inputting a caller ID, registration of a telephone book or setting of various functions to the control part 105. A display part 135 displays telephone number on incoming and outgoing or setting of various functions interlocked with the key input part 134. Further, the control part 105 normally has an external connector 136 made of a 16-core connector and is connected to an external device through a special cable and conducts data communications with the external device using a start-stop synchronous function 141 within the control part 105. Also, the control part 105 normally includes time means such as a timer 142.

As shown in FIG. 10, the incoming notification pattern setting circuit of the portable telephone of the conventional art comprises a CPU 201, ROM 202, RAM 203, ID-ROM 204, an output port register 205, an LED driver 206, and a plurality of LEDs 207.

The CPU 201 operates based on programs stored in the ROM 202 and checks number information in control data in the received signal from the wireless send/receive part 102 with data of a call number of a local apparatus held in the ID-ROM 204 and when a call to the local apparatus is detected, the output port register 205 is controlled directly by outputting a write signal and data previously held in the RAM 203 is read out and is once held in the output port register 205 through an address/data bus and thereafter, by outputting the data to the LED driver 206, the LED driver 206 provides incoming notification by light in the LEDs 207 by controlling the LEDs 207 based on this data.

However, in the incoming notification pattern setting technique of the conventional portable telephone, incoming notification patterns capable of expression by light, for example, simply lights and flashes during a notification period by selecting one color or a fixed combination from the plurality of LEDs and there is a limit to identification of originators, and also it was impossible for a user to freely create incoming notification patterns and an ability to express originality was also poor.

SUMMARY OF THE INVENTION

This invention is implemented in view of the above-mentioned circumstances, and it is an object of the invention to provide an incoming notification pattern setting circuit and method of a portable telephone constructed so that driving patterns can also be set freely to incoming notification means by a vibrator while combinations of lighting colors or lighting patterns can be set freely from the outside to incoming notification means by light.

In order to solve the above problems, an incoming notification pattern setting circuit of a portable telephone of the present invention comprises memory means for storing data of notification patterns and data of the tempo for generating patterns of a change in lighting colors by combinations of flashing of plural LEDs by respectively driving the plural LEDs with different colors every tempo, driving data generation means for repeatedly generating driving data for driving the plural LEDs by data written from said memory means, and driving means for independently driving the plural LEDs respectively according to the driving data, and it is characterized in that it is constructed so that the data of the memory means can be set from the outside.

The driving data generation means may comprise FIFO read signal generation means for generating a read signal for directing readout from FIFO means every tempo, FIFO means for holding pattern data read from the memory means on a first-in first-out basis to output the pattern data according to the read signal and also generating an interruption at the time when a predetermined amount of data is outputted, and control means for outputting subsequent data from the memory means to the FIFO means according to the interruption.

The driving data generation means may comprise two-port memory means for holding pattern data read from the memory means to output the pattern data according to a read address, RAM read signal generation means for generating a read signal for directing readout from said two-port memory means every tempo, and read address generation means for repeatedly generating the read address of the pattern data to the two-port memory means according to the read signal.

The driving means may be constructed to drive a vibrator in synchronization with a driving pattern to any one of the plural LEDs.

The driving patterns of the LEDs selected for driving the vibrator may be switched from the outside in the driving means.

An incoming notification pattern setting method of a portable telephone on the present invention is characterized in that data of notification patterns and data of the tempo for generating patterns of a change in lighting colors by combinations of flashing of plural LEDs by respectively driving the plural LEDs with different colors every tempo are stored in memory means, and in driving data generation means, driving data for driving the plural LEDs by data written from said memory means is repeatedly generated, and in driving means, the plural LEDs, respectively, are independently driven according to the driving data, and also the data of the memory means is set from the outside.

In this method, the vibrator may be driven in synchronization with a driving pattern to any one of the plural LEDs in the driving means.

The data of notification patterns and the data of the tempo stored in the memory means can be set for every partner registered in a telephone book function so that incoming notification is performed by the notification pattern data and the tempo corresponding to an outgoing number at the time of incoming from the partner which informs my side of the outgoing number.

The data of notification patterns and the data of the tempo stored in the memory means may be inputted from a manipulation part.

In a configuration of this invention, a portable telephone apparatus comprises memory means for storing data of notification patterns and data of the tempo for generating patterns of a change in lighting colors by combinations of flashing of plural LEDs by respectively driving the plural LEDs with different colors every tempo, driving data generation means for repeatedly generating driving data for driving the plural LEDs by data written from said memory means, and driving means for independently driving the plural LEDs respectively according to the driving data, and it is constructed so that the data of the memory means can be set from the outside, so that a user can freely set the patterns of a change in lighting colors by combinations of flashing of plural LEDs and periods of the change.

BRIEF DESCRIPTION OF THE DRAWINGS

Specific embodiments of the present invention will now be described, by way of example only, with reference to the accompanying of drawings in which:

FIG. 4 is a diagram showing an incoming notification pattern data setting format;

DETAILED DESCRIPTION OF THE PREFERRED EMBODIMENTS

First Embodiment

Figure 1:
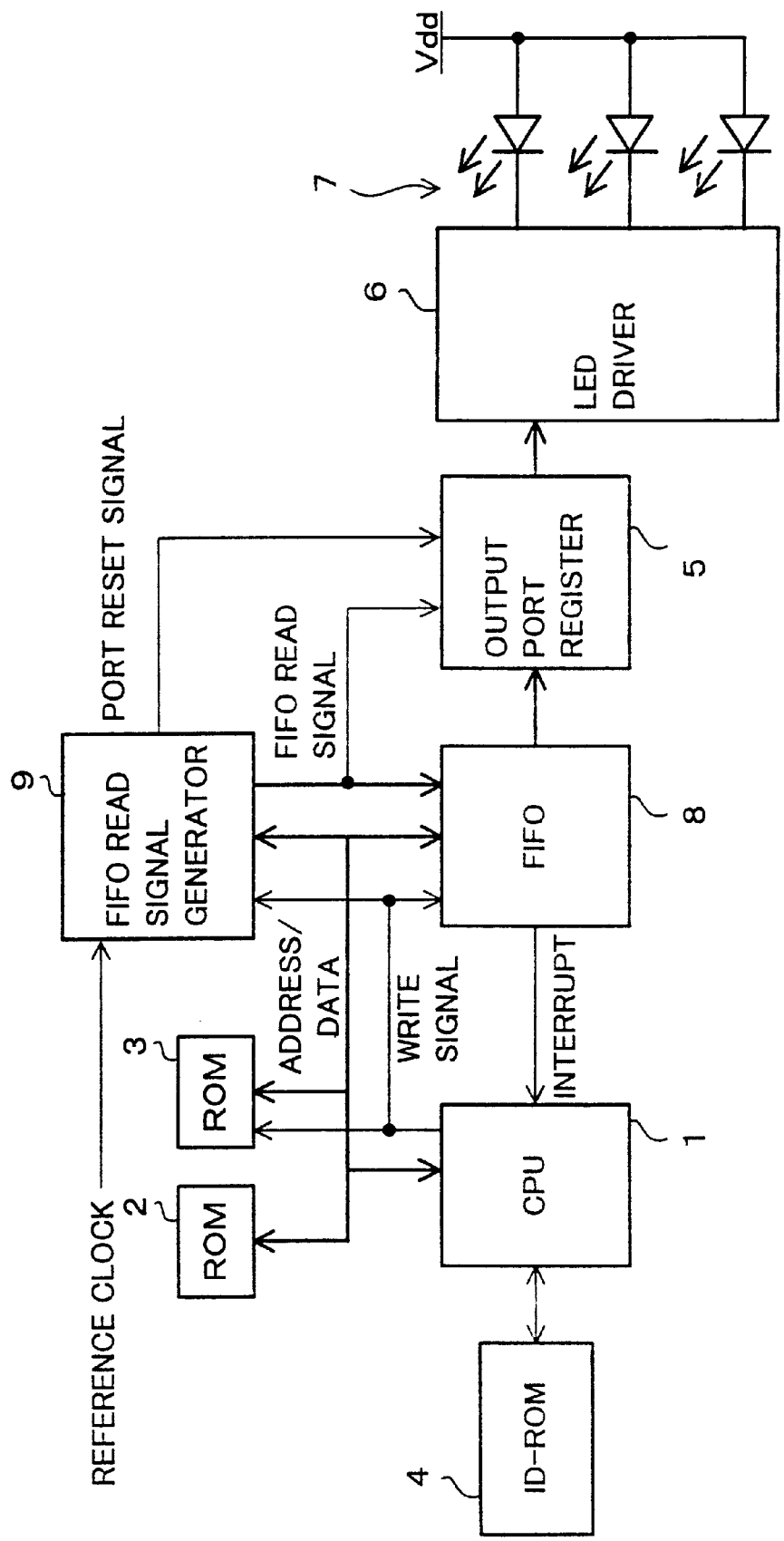
FIG. 1 is a block diagram showing a configuration of an incoming notification pattern setting circuit of a portable telephone according to a first embodiment of this invention.
Figure 2:
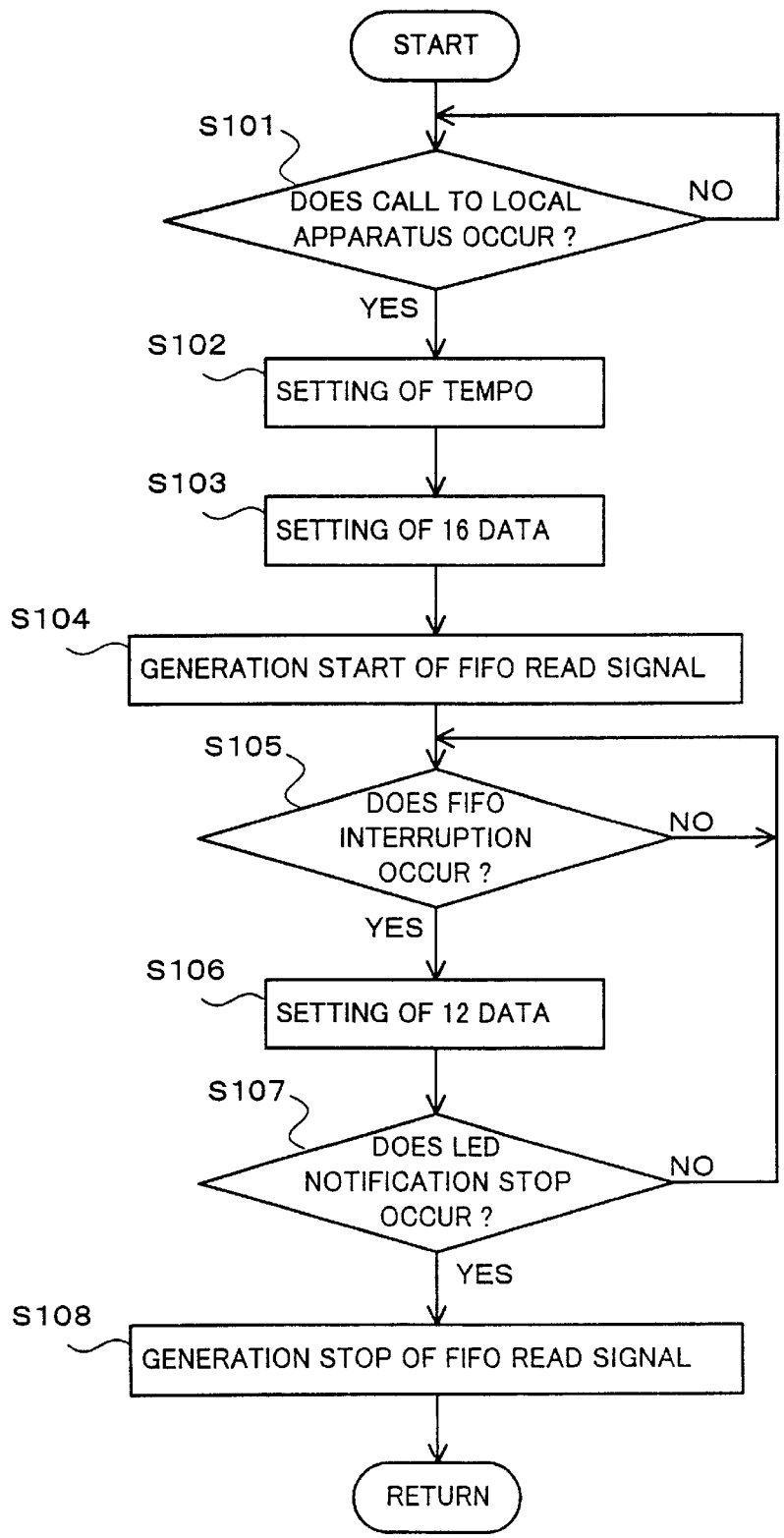
FIG. 2 is a flowchart showing operations in the incoming notification pattern setting circuit of the portable telephone of the present embodiment.
Figure 3:
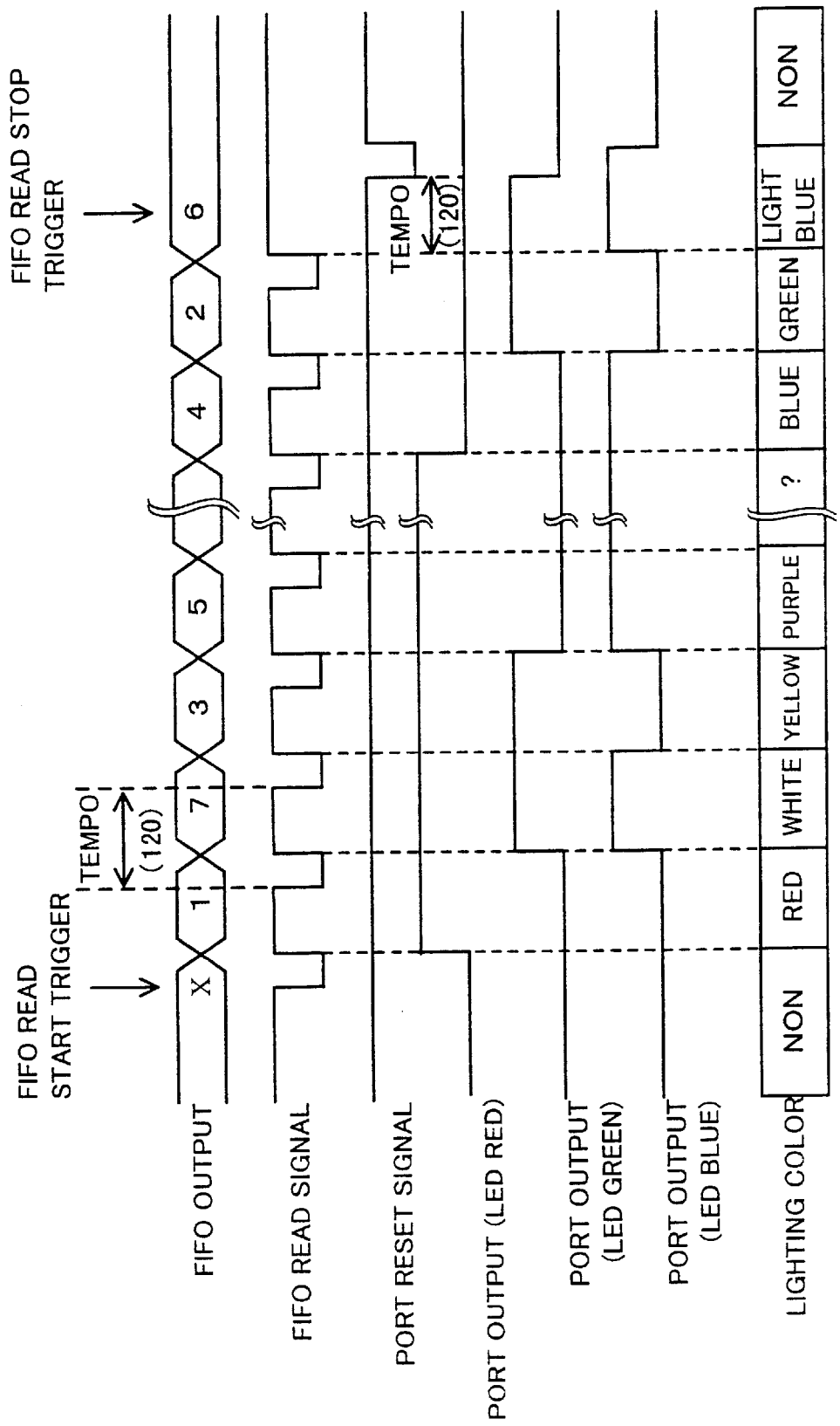
FIG. 3 is a timing chart showing operations of the incoming notification pattern setting circuit of the portable telephone of the present embodiment.
Figure 4:
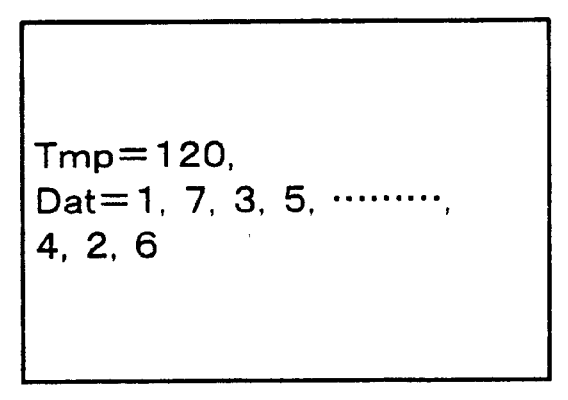

FIG. 1 is a block diagram showing a configuration of an incoming notification pattern setting circuit of a portable telephone according to a first embodiment of this invention, and FIG. 2 is a flowchart showing operations in the incoming notification pattern setting circuit of the portable telephone of the present embodiment, and FIG. 3 is a timing chart showing operations of the incoming notification pattern setting circuit of the portable telephone of the present embodiment, and FIG. 4 is a diagram showing an incoming notification pattern data setting format.

Since a configuration of a portable telephone apparatus to which an incoming notification pattern setting circuit of this example is applied is similar to that shown in FIG. 9, a detailed description of this configuration is omitted below.

As shown in FIG. 1, the incoming notification pattern setting circuit of the portable telephone of this example generally comprises a CPU 1, ROM 2, RAM 3, ID-ROM 4, an output port register 5, an LED driver 6, LEDs 7, first-in first-out memory (FIFO) 8, and an FIFO read signal generator 9.

The CPU 1 performs control of incoming notification to the FIFO 8 and the FIFO read signal generator 9. The ROM 2 stores programs necessary for operations of the CPU 1. The RAM 3 previously holds pattern data for incoming notification and data of a tempo based on settings of a user. The ID-ROM 4 holds data of a call number of a local apparatus. The output port register 5 holds output data of the FIFO 8 and outputs the data to the LED driver 6. The LED driver 6 outputs a driving signal to the LEDs 7. The LEDs 7, for example, comprise a plurality of LEDs for generating light with respectively different colors. The FIFO 8 reads and outputs the pattern data outputted from the RAM 3 by a first-in first-out operation. The FIFO read signal generator 9 outputs an FIFO read signal to the FIFO 8 according to a reference clock and outputs a port reset signal to the output port register 5.

Next, operations of the incoming notification pattern setting circuit of the portable telephone of this example will be described using FIG. 1.

The CPU 1 operates based on the programs stored in the ROM 2 and performs incoming notification operations when a call to a local apparatus is detected by checking number information in control data in the received signal received from the wireless send/receive part 102 with data of a call number of the local apparatus held in the ID-ROM 4.

In this case, when incoming notification by light is performed using the LEDs 7, the pattern data held in the RAM 3 based on the settings of the user is periodically written to the FIFO 8 according to a write signal. The FIFO read signal generator 9 periodically generates FIFO read signals based on a reference clock (for example, the same clock as an operating clock of the CPU 1) according to an FIFO read start trigger from the CPU 1. A period of the FIFO read signal can be set by control of the CPU 1.

The FIFO 8 writes the pattern data to the output port register 5 according to the FIFO read signal, and the LED driver 6 drives the LEDs 7 to perform incoming notification by light according to the pattern data from the output port register 5.

The FIFO 8 generates an interruption to the CPU 1 when the amount of the remaining data reaches a predetermined value, and the subsequent pattern data is read from the RAM 3 and is set to the FIFO 8 according to the amount of free data of the FIFO 8 when the CPU 1 receives an interruption.

At the completion of operation of incoming notification, the CPU 1 outputs an FIFO read stop trigger and thereby, an FIFO read signal is not generated at the timing of the next FIFO read signal generation, and a port reset signal is outputted to the output port register 5 at the timing of the next FIFO read signal completion and thereby, the contents of the output port register 5 are reset.

By such an operation, data written to the FIFO 8 is periodically set to the output port register 5 and thereby, flashing of plural LEDs in the LEDs 7 is controlled through the LED driver 6, so that incoming notification by patterns of a change in a lighting color by combinations of the LEDs with various colors and periods of the change can be implemented.

Incidentally, as an acquisition method of the pattern data held in the RAM 3 set by a user, for example, the following various methods can be used.

(1) By manipulations in a manipulation part (not shown), a user manually inputs pattern data directly.

(2) By a mail receiving function, pattern data is received as data attached to mail and a user sets the data.

(3) By a server connection function, pattern data is downloaded from a server and a user sets the data.

(4) By a connection function with a personal computer, data newly created with a personal computer or data sent from a portable telephone apparatus to a personal computer and edited with the personal computer is captured from the personal computer and a user sets the data.

A flow of operations of the CPU 1 on incoming in the incoming notification pattern setting circuit of the portable telephone of this example will be described below with reference to FIGS. 1 and 2. Incidentally, in this example, it is assumed that a depth of the FIFO 8 is 16 and when the remaining depth reaches 4, an interruption is generated to the CPU 1. Also, it is assumed that the CPU 1 executes the following operations by programs stored in the ROM 2.

The CPU 1 monitors whether a call to a local apparatus occurs or not (Step S101) and if so, a tempo (a generation period of the FIFO read signal) is set to the FIFO read signal generator 9 based on data of the RAM 3 (Step S102). Next, the CPU 1 reads 16 pattern data from the RAM 3 and sets the data to the FIFO 8 (Step S103), and directs a generation start of the FIFO read signal to the FIFO read signal generator 9 (Step S104), and enters an interruption wait state from the FIFO 8 (Step S105).

The CPU 1 sets 12 data to the FIFO 8 every interruption generation from the FIFO 8 (Step S106) and checks whether a condition of an LED notification stop by a time-out of incoming notification operations or incoming notification stop manipulations of a user occurs or not (Step S107) and if so, directions of a generation stop of the FIFO read signal are given to the FIFO read signal generator 9 (Step S108).

Next, a change in signals for incoming notification associated with the above-mentioned operations of the CPU will be described with reference to FIGS. 3 and 4. Incidentally, in this case, as LED pattern data driven by the LED driver 6, data of three bits is associated with LEDs of three colors (red, green, blue), and a high-order bit, a middle-order bit and a low-order bit, respectively, are allocated to the LED of red, the LED of green and the LED of blue. Then, it is assumed that lighting colors are set by seven kinds of data made of combinations of each bit and for the lighting colors of each data, data 1 is red and data 2 is green and data 3 is yellow and data 4 is blue and data 5 is purple and data 6 is light blue and data 7 is white. It is assumed that 16 data made of such data is set by a format shown in FIG. 4 in the RAM 3.

When the call to the local apparatus occurs, a generation tempo of the FIFO read signal is set using 120 clocks as one tempo and 16 data are set to the FIFO 8 and thereby, an FIFO output as shown in FIG. 3 is generated. By an FIFO read start trigger from the CPU 1, the FIFO read signal is outputted every tempo and data of each color is sequentially outputted from the FIFO 8 and according to port outputs corresponding to the respective data, the LED of red, the LED of green and the LED of blue are selected to turn on or turn off them and thereby, lighting colors of incoming notification are determined.

By directions of the LED notification stop, an FIFO read stop trigger is outputted from the CPU 1 and a port reset signal is outputted to the output port register 5 at the timing of the next FIFO read signal completion and thereby, all of each the LED are turned off.

According to the incoming notification pattern setting circuit of the portable telephone of this example thus, patterns of a change in a lighting color by combinations of flashing of the plural LEDs which are periodically turned on or off can be controlled and also a period of the change can be set.

Second Embodiment

Figure 5:
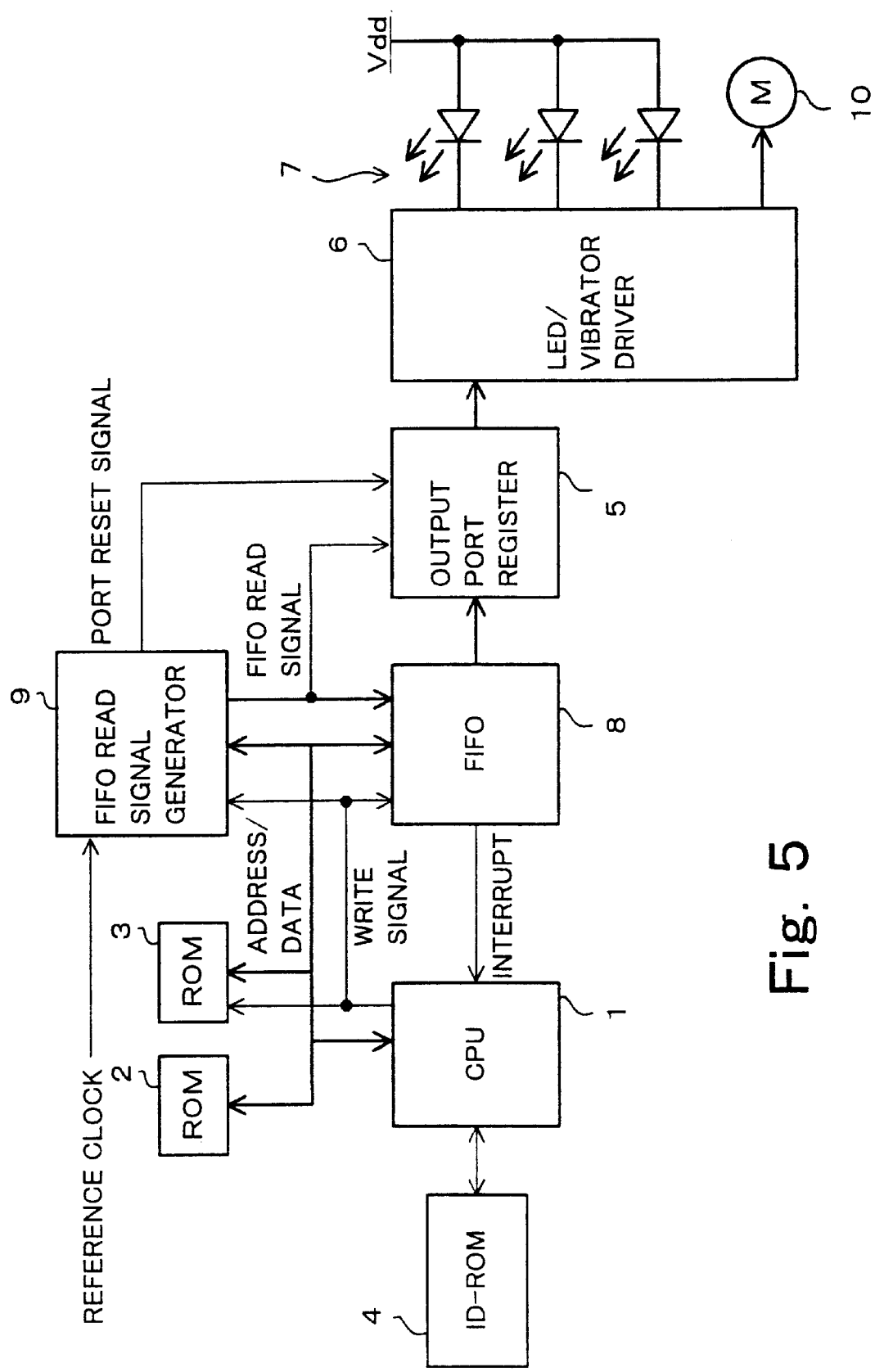
FIG. 5 is a block diagram showing a configuration of an incoming notification pattern setting circuit of a portable telephone according to a second embodiment of this invention.

FIG. 5 is a block diagram showing a configuration of an incoming notification pattern setting circuit of a portable telephone according to a second embodiment of this invention.

Figure 9:
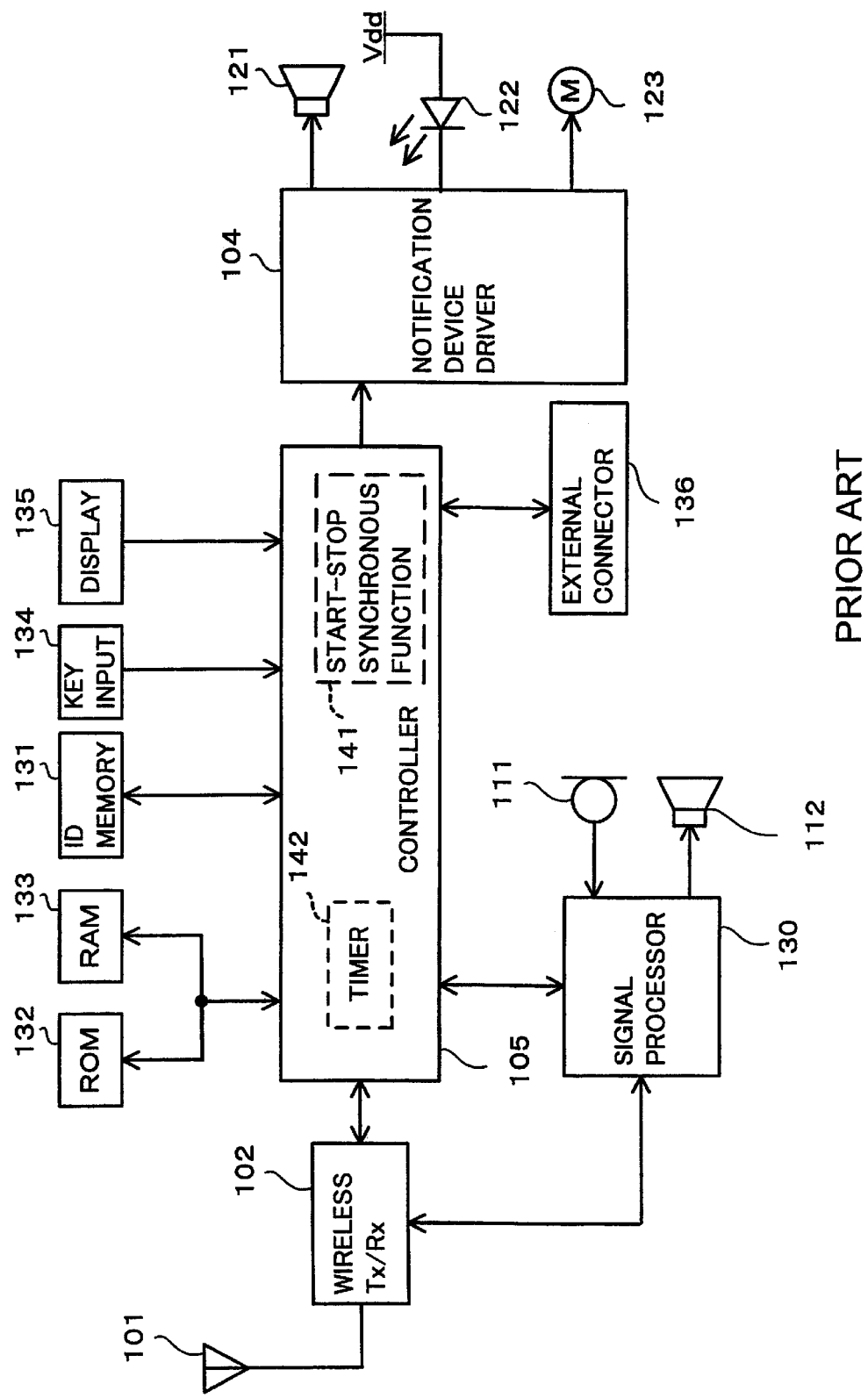
FIG. 9 is a block diagram showing a configuration example of a portable telephone apparatus capable of setting incoming notification patterns to which the conventional art and the present invention are applied.

A configuration of a portable telephone apparatus to which an incoming notification pattern setting circuit of this example is applied is similar to that shown in FIG. 9.

As shown in FIG. 5, the incoming notification pattern setting circuit of the portable telephone of this example generally comprises a CPU 1, ROM 2, RAM 3, ID-ROM 4, an output port register 5, an LED/vibrator driver 6A, LEDs 7, first-in first-out memory (FIFO) 8, an FIFO read signal generator 9, and a vibrator 10.

Among them, configurations and operations of the CPU 1, the ROM 2, the RAM 3, the ID-ROM 4, the output port register 5, the LEDs 7, the FIFO 8 and the FIFO read signal generator 9 are similar to that of the case of the first embodiment shown in FIG. 1, but there are large differences in that the vibrator 10 other than the LEDs is provided as an incoming notification function and the LED/vibrator driver 6A is provided as a circuit for driving.

In a manner similar to the case of the first embodiment, the LED/vibrator driver 6A performs on-off control of vibrations of the vibrator 10 in synchronization with lighting patterns of the LEDs while performing lighting control of the LEDs 7. The vibrator 10 performs incoming notification by vibration by vibrating according to the control of the LED/vibrator driver 6A.

As a method of drive control to the vibrator 10 in this case, for example, it may be constructed so as to take a driving by making a conversion into an output signal suitable for driving the vibrator 10 in the LED/vibrator driver 6A using a driving pattern to any one of the LEDs of driving patterns to each of the plural LEDs from the output port register 5, or it may be constructed so as to drive the vibrator 10 by switching the driving patterns to each of the plural LEDs by providing suitable switching means.

According to the incoming notification pattern setting circuit of the portable telephone of this example thus, the vibrator is added to a notification device controlled at an output port as the notification device other than light. In this case, originality by tone (vibration frequency) cannot be expressed, but various on-off patterns can be set, so that originators can be identified by the difference in vibration patterns. Thus, it is useful in the case of a manner mode of providing incoming notification without tone.

Third Embodiment

Figure 6:
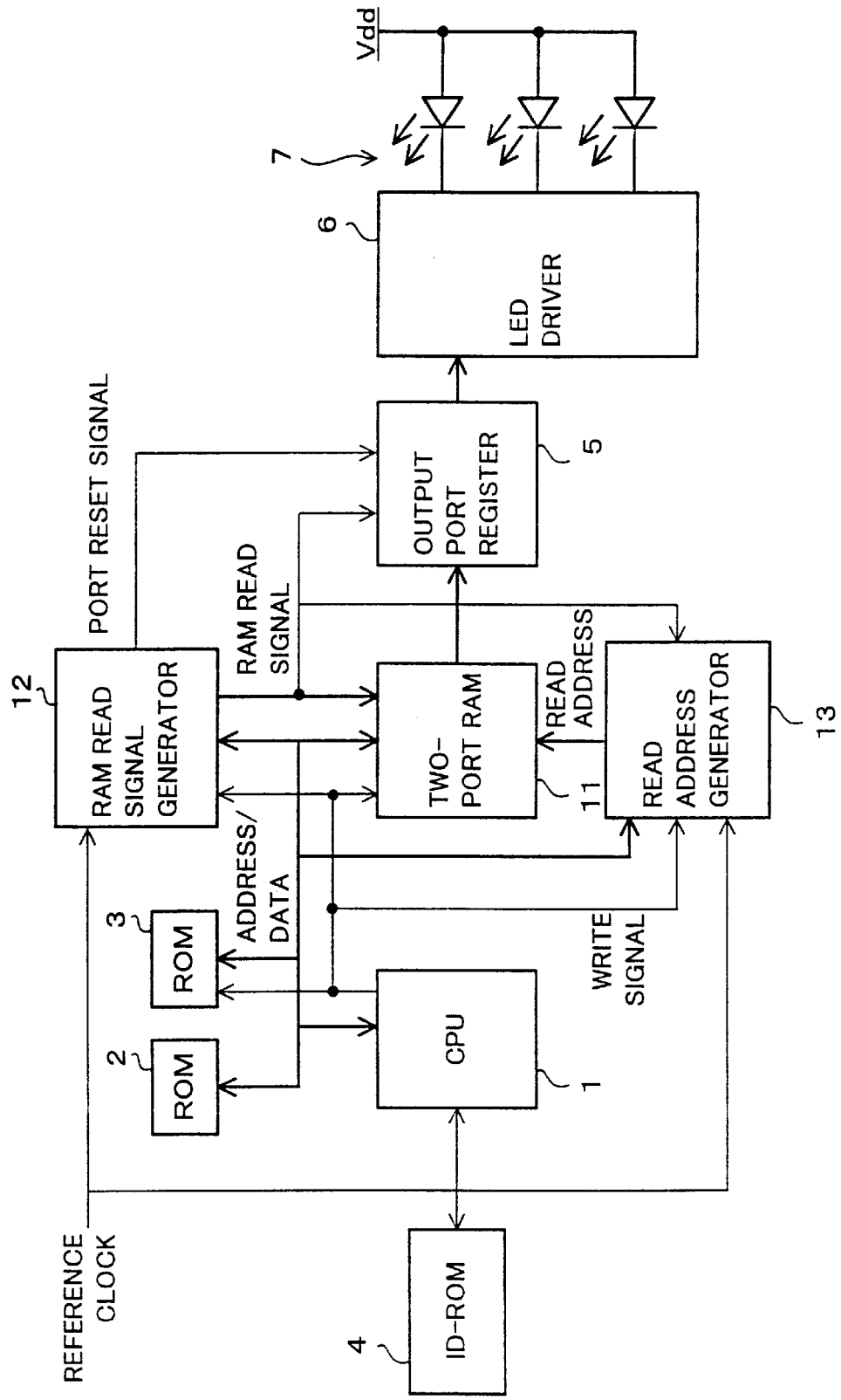
FIG. 6 is a block diagram showing a configuration of an incoming notification pattern setting circuit of a portable telephone according to a third embodiment of this invention.
Figure 7:
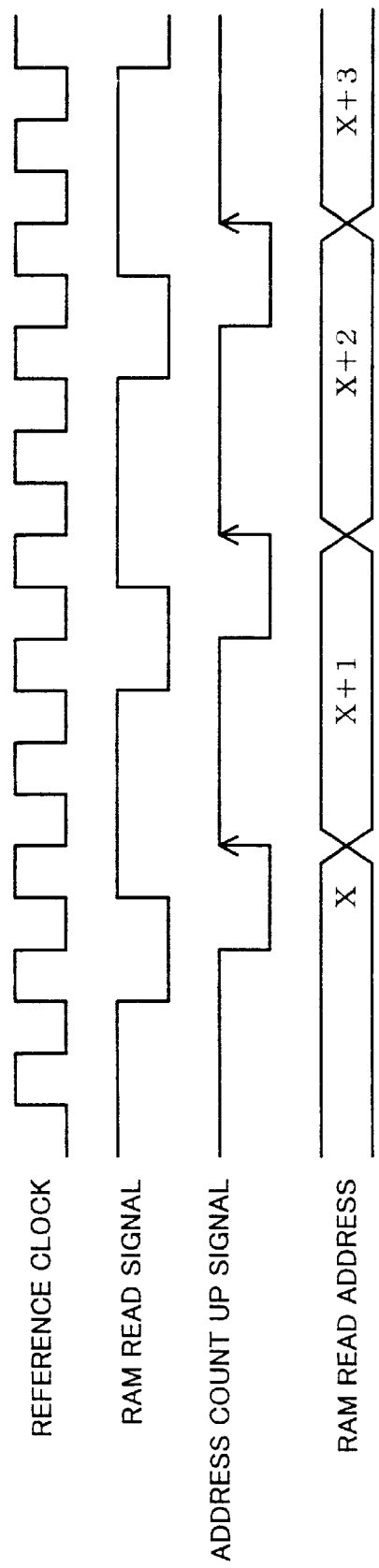
FIG. 7 is a timing chart showing operations of the incoming notification pattern setting circuit of the portable telephone of the present embodiment.
Figure 8:
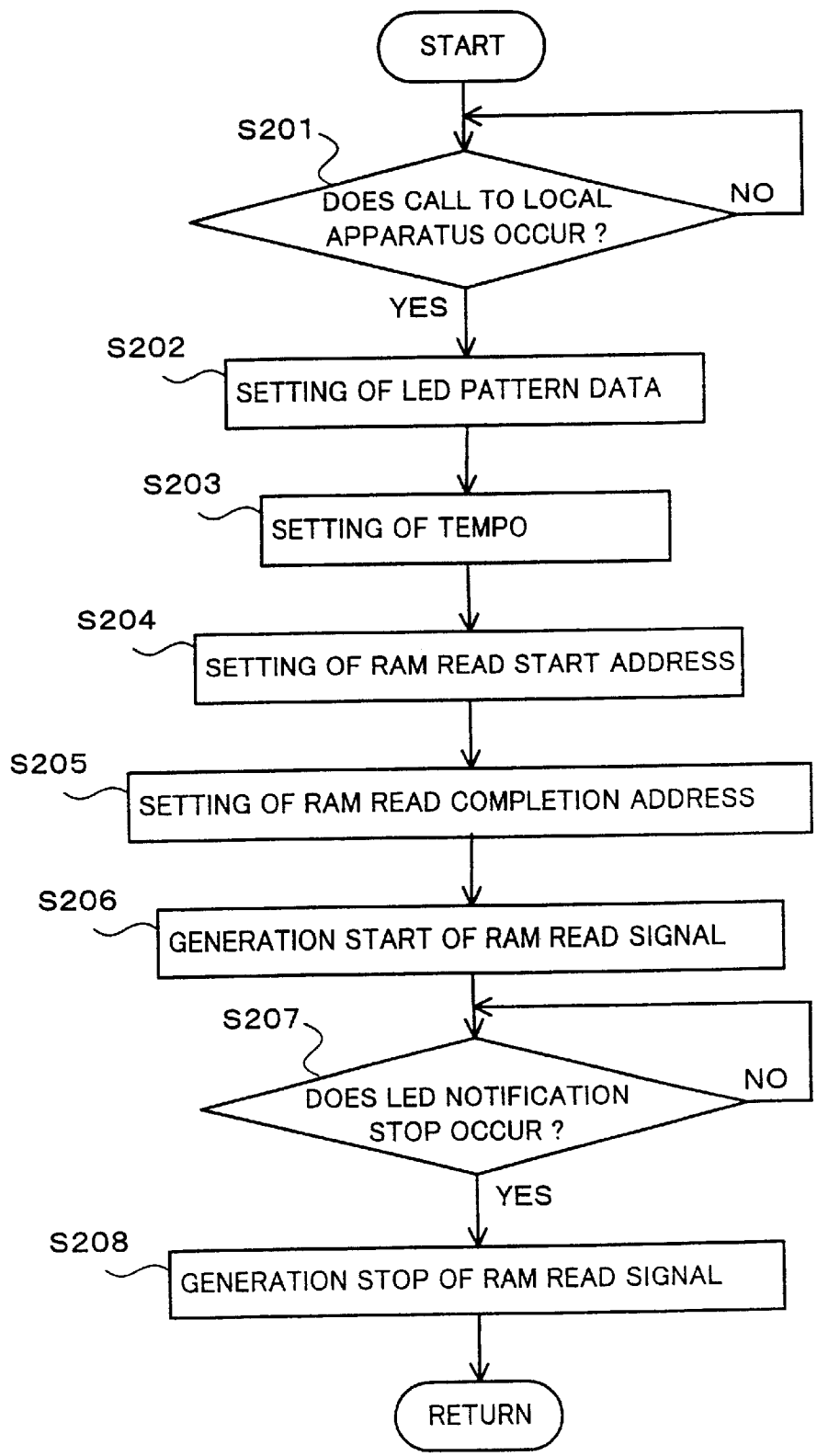
FIG. 8 is a flowchart showing operations in the incoming notification pattern setting circuit of the portable telephone of the present embodiment.

FIG. 6 is a block diagram showing a configuration of an incoming notification pattern setting circuit of a portable telephone according to a third embodiment of this invention, and FIG. 7 is a timing chart showing operations of the incoming notification pattern setting circuit of the portable telephone of the present embodiment, and FIG. 8 is a flowchart showing operations in the incoming notification pattern setting circuit of the portable telephone of the present embodiment.

A configuration of a portable telephone apparatus to which an incoming notification pattern setting circuit of this example is applied is similar to that shown in FIG. 9.

As shown in FIG. 6, the incoming notification pattern setting circuit of the portable telephone of this example generally comprises a CPU 1, ROM 2, RAM 3, ID-ROM 4, an output port register 5, an LED driver 6, LEDs 7, twoport RAM 11, a RAM read signal generator 12, and a read address generator 13.

Among them, configurations and operations of the CPU 1, the ROM 2, the RAM 3, the ID-ROM 4, the output port register 5, the LED driver 6 and the LEDs 7 are similar to that of the case of the first embodiment shown in FIG. 1, but there are large differences in that the two-port RAM 11, the RAM read signal generator 12 and the read address generator 13 are provided instead of the FIFO 8 and the FIFO read signal generator 9.

The two-port RAM 11 holds incoming notification pattern data from the RAM 3 and repeatedly outputs data from a read start address to a read completion address according to a RAM read signal. According to a reference clock, the RAM read signal generator 12 outputs the RAM read signal to the two-port RAM 11 and outputs a port-reset signal to the output port register 5. The read address generator 13 outputs a read address to the two-port RAM 11.

Next, operations of the incoming notification pattern setting circuit of the portable telephone of this example will be described using FIG. 6.

The CPU 1 operates based on programs stored in the ROM 2 and performs incoming notification when a call to a local apparatus is detected by checking number information in control data in the received signal received from the wireless send/receive part 102 with data of a call number of the local apparatus held in the ID-ROM 4.

In this case, when incoming notification by light is performed using the LEDs 7, pattern data held in the RAM 3 based on settings of a user is written to the two-port RAM 11 according to a write signal. The RAM read signal generator 12 periodically generates RAM read signals based on a reference clock according to a RAM read start trigger from the CPU 1. A period of the RAM read signal can be set by control of the CPU 1.

The read address generator 13 counts up an address of the two-port RAM 11 on the rising edge of an address count up signal obtained by again providing timing of the RAM read signal from the RAM read signal generator 12 by the reference clock. By this, data from the read start address to the read completion address is written from the two-port RAM 11 to the output port register 5, so that the LED driver 6 drives the LEDs 7 to perform incoming notification by light according to the pattern data from the output port register 5. The read address generator 13 counts up an address every time generation of the RAM read signal.

At the completion of operation of incoming notification, the CPU 1 outputs a RAM read stop trigger and thereby, the RAM read signal from the RAM read signal generator 12 stops, so that the read address generator 13 completes the count up of the address and also, a port reset signal is outputted to the output port register 5 from the RAM read signal generator 12 and thereby, the contents of the output port register 5 are reset.

FIG. 7 describes generation of a read address to the two-port RAM 11 in this case.

As shown in FIG. 7, the read address generator 13 generates the address count up signal internally by again providing timing of the RAM read signal from the RAM read signal generator 12 by the reference clock, and counts up an address as X, X+1, X+2, . . . on the rising edge of this address count up signal and outputs the address to the two-port RAM 11 as a RAM read address.

In this manner, the read address generator 13 generates the read address to the two-port RAM 11 by performing operations of incrementing the address on the timing shown in FIG. 7 during the range from the RAM read start address to the RAM read completion address.

A flow of operations of the CPU 1 on incoming in the incoming notification pattern setting circuit of the portable telephone of this example will be described below with reference to FIGS. 6 and 8. It is assumed that the CPU 1 executes the following operations by programs stored in the ROM 2.

The CPU 1 monitors whether a call to a local apparatus occurs or not (Step S201) and if so, pattern data previously registered in the RAM 3 is set to the two-port RAM 11 (Step S202) and also, a tempo (a generation period of the RAM read signal) is set to the RAM read signal generator 12 (Step S203) and further, the read start address (Step S204) and the read completion address (Step S205) of the two-port RAM 11 are set to the read address generator 13 and thereafter, a generation start of the RAM read signal is directed to the RAM read signal generator 12 (Step S206).

Then, it is checked whether a condition of an LED notification stop by a time-out of incoming notification operations or incoming notification stop manipulations of a user occurs or not (Step S207) and if so, directions of a generation stop of the RAM read signal are given to the RAM read signal generator 12 (Step S208).

According to the incoming notification pattern setting circuit of the portable telephone of this example thus, once the CPU 1 sets the pattern data to the two-port RAM 11, the set patterns are repeatedly outputted subsequently, so that the CPU 1 does not need to set the pattern data every generation of an interruption and a processing load of the CPU 1 can be reduced. However, in comparison with the case of using the FIFO as the first embodiment, a capacity of the two-port RAM is generally large and also the read address generator is required, so that a circuit scale becomes large.

Though the embodiments of this invention have been described above in detail by the drawings, a concrete configuration is not limited to these embodiments and changes in design of the scope without departing from the main point of this invention is included in this invention. For example, in the third embodiment, it may be constructed so as to set the pattern data to the two-port RAM 11 at the time when a user registers the pattern data. Also, in the second embodiment, vibration patterns of the vibrator synchronizes with lighting patterns of the LED, but it may be constructed so as to provide the vibration patterns different from the lighting patterns of the LED without a limit to this. Further, concurrent use of the vibrator is not limited to the case of the first embodiment and may also be applied to the case of the third embodiment. Furthermore, it may be a configuration capable of solely driving only the vibrator without driving the LED.

Figure 10:
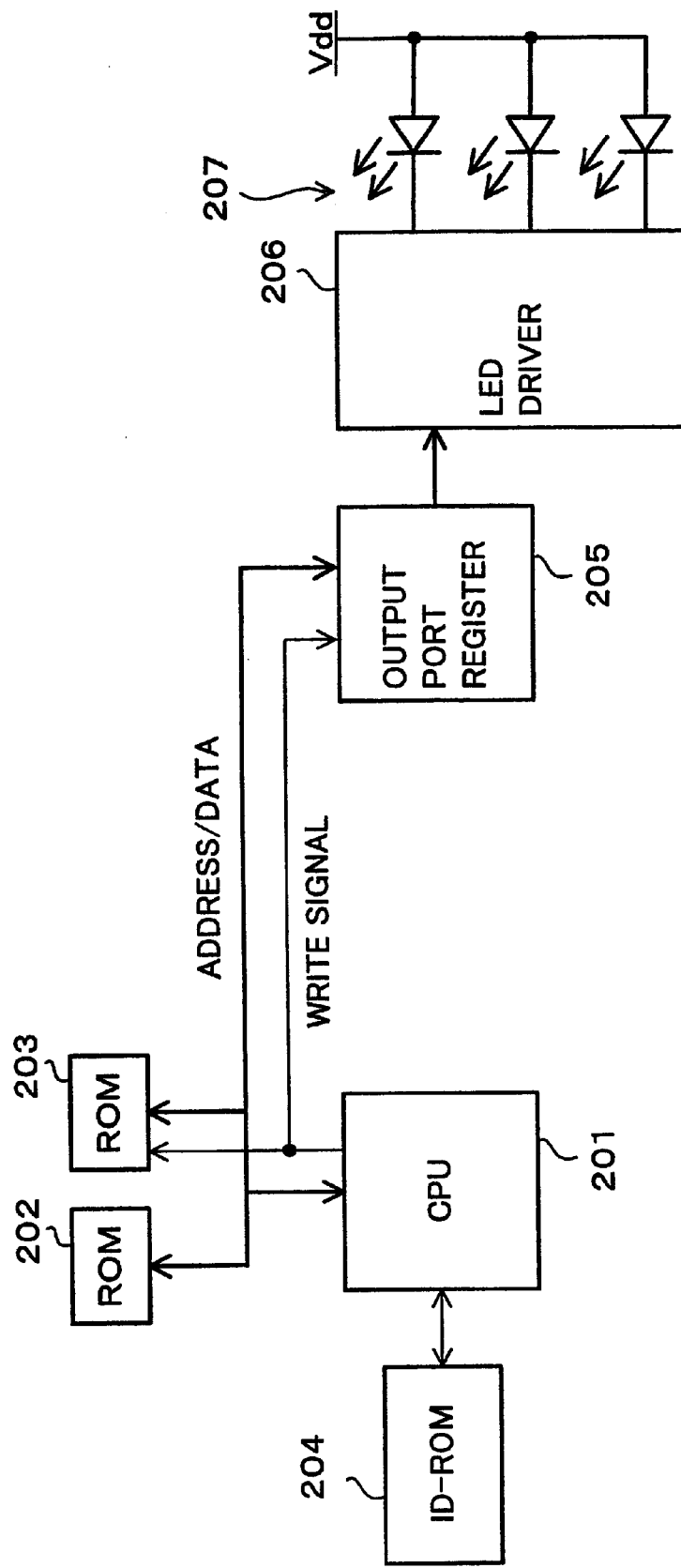
FIG. 10 is a block diagram showing a configuration example of an incoming notification pattern setting circuit of a conventional portable telephone.

Incidentally, in the incoming notification pattern setting circuit of the conventional art shown in FIG. 10, the CPU 201 makes data settings to the output port register 205 using a built-in timer and thereby, a configuration of achieving the function equivalent to the case of providing the FIFO read signal generator 9 or the RAM read signal generator 12 of the case of each the above embodiment can be provided and in this case, a dedicated circuit for incoming notification pattern setting is not required, so that a circuit scale becomes small, but in comparison with the case of each the above embodiment, processing of setting data to the output port register frequently occurs, so that a load of the CPU increases. Also, the. CPU periodically sets an output port using the timer, so that a switching period of the patterns is not correct strictly in case that other priority interruption processing occurs.

As described above, according to the incoming notification pattern setting circuit and method of the portable telephone of this invention, combinations of the plural LEDs which are periodically turned on or off can be controlled and also the period can be set, so that combinations of various lighting color patterns of the incoming notification LED and the period can be implemented.

Therefore, without troubling surrounding people as the case of using sound, originality can be expressed using only light (particularly, at night) and also different incoming lighting patterns can be specified every partner of a telephone book registered in a local apparatus with little limit, and it can immediately be determined whether there is incoming from the registered originator or not and there is incoming from someone particularly at a dark place, and for example, it can be identified by only looking into a bag without taking out a portable telephone even in the case of holding the portable telephone in the bag, so that identification on incoming can be improved remarkably when the partner informs my side of the telephone number.

Also, in combination of incoming notification by light, the originator can be identified by the difference in vibration patterns by the vibrator and thus, it is useful in the case of a manner mode of performing incoming notification without using sound.

What is claimed is:

1. An incoming notification pattern setting circuit of a portable telephone, comprising memory means for storing data of notification patterns and data of the tempo for generating patterns of a change in lighting colors by combinations of flashing of plural LEDs by respectively driving the plural LEDs with different colors ever tempo, driving data generation means for repeatedly generating driving data for driving the plural LEDs by data written from said memory means, and driving means for independently driving the plural LEDs respectively according to the driving data, characterized in that it is constructed so that the data of the memory means can be set from the outside using a personal computer.

2. An incoming notification pattern setting circuit of a portable telephone as defined in claim 1, wherein the driving data generation means comprises FIFO read signal generation means for generating a read signal for directing readout from FIFO means every tempo, FIFO means for holding pattern data read from the memory means on a first-in first-out basis to output the pattern data according to the read signal and also generating an interruption at the time when a predetermined amount of data is outputted, and control means for outputting subsequent data from the memory means to the FIFO means according to the interruption.

3. An incoming notification pattern setting circuit of a portable telephone as in claim 2, wherein it is constructed so that the driving means can drive a vibrator in synchronization with a driving pattern to any one of the plural LEDs or independently in no synchronization with any driving patterns to the plural LEDs.

4. An incoming notification pattern setting circuit of a portable telephone as defined in claim 3, wherein it is constructed so the driving patterns of the LEDs selected for driving the vibrator can be switched from the outside in the driving means.

5. An incoming notification pattern setting circuit of a portable telephone as defined in claim 1, wherein the driving data generation means comprises two-port memory means for holding pattern data read from the memory means to output the pattern data according to read address, RAM read signal generation means for generating a read signal for directing readout from said two-port memory means every tempo, and read address generation means for repeatedly generating the read address of the pattern data to the two-port memory means according to the read signal.

6. An incoming notification pattern setting circuit of a portable telephone as in claim 5, wherein it is constructed so that the driving means can drive a vibrator in synchronization with a driving pattern to any one of the plural LEDs or independently in no synchronization with any driving patterns to the plural LEDs.

7. An incoming notification pattern setting circuit of a portable telephone as defined in claim 6, wherein it is constructed so the driving patterns of the LEDs selected for driving the vibrator can be switched from the outside in the driving means.

8. An incoming notification pattern setting circuit of a portable telephone as in claim 1, wherein it is constructed so that the driving means can drive a vibrator in synchronization with a driving pattern to any one of the plural LEDs or independently in no synchronization with any driving patterns to the plural LEDs.

9. An incoming notification pattern setting circuit of a portable telephone as defined in claim 8, wherein it is constructed so that the driving patterns of the LEDs selected for driving the vibrator can be switched from the outside in the driving means.

10. An incoming notification pattern setting method of a portable telephone, characterized in that data of notification patterns and data of the tempo for generating patterns of a change in lighting colors by combinations of flashing of plural LEDs by respectively driving the plural LEDs with different colors every tempo are stored in memory means, and in driving data generation means, driving data for driving the plural LEDs by data written from said memory means is repeatedly generated, and in driving means, the plural LEDs respectively, are independently driven according to the driving data, and also the data of the memory means is set using a personal computer.

11. An incoming notification pattern setting method of a portable telephone as defined in claim 10, wherein a vibrator is driven in synchronization with a driving pattern to any one of the plural LEDs or independently in no synchronization with any driving patterns to the plural LEDs in the driving means.

12. An incoming notification pattern setting method of a portable telephone as defined in claim 11, wherein by setting the data of notification patterns and the data of the tempo stored in the memory means every partner registered in a telephone book function, incoming notification is performed by the notification pattern data and the tempo corresponding to an outgoing number at the time of incoming from the partner which denotes the outgoing number.

13. An incoming notification pattern setting method of a portable telephone as in claim 11, wherein the data of notification patterns and the data of the tempo stored in the memory means are inputted from a manipulation part.

14. An incoming notification pattern setting method of a portable telephone as in claim 12, wherein the data of notification patterns and the data of the tempo stored in the memory means are inputted from a manipulation part.

15. An incoming notification pattern setting method of a portable telephone as defined in claim 10, wherein by setting the data of notification patterns and the data of the tempo stored in the memory means every partner registered in a telephone book function, incoming notification is performed by the notification pattern data and the tempo corresponding to an outgoing number at the time of incoming from the partner which informs my side of the outgoing number.

16. An incoming notification pattern setting method of a portable telephone as in claim 15, wherein the data of notification patterns and the data of the tempo stored in the memory means are inputted from a manipulation part.

17. An incoming notification pattern setting method of a portable telephone as in claim 10, wherein the data of notification patterns and the data of the tempo stored in the memory means are inputted from a manipulation part.

18. An incoming notification pattern setting circuit of a portable telephone, comprising memory means for storing data of notification patterns and data of the tempo for generating patterns of a change in lighting colors by combinations of flashing of plural LEDs by respectively driving the plural LEDs with different colors ever tempo, driving data generation means for repeatedly generating driving data for driving the plural LEDs by data written from said memory means, and driving means for independently driving the plural LEDs respectively according to the driving data, characterized in that it is constructed so that the data of the memory means can be set by downloading from server.

19. An incoming notification pattern setting circuit of a portable telephone, comprising memory means for storing data of notification patterns and data of the tempo for generating patterns of a change in lighting colors by combinations of flashing of plural LEDs by respectively driving the plural LEDs with different colors ever tempo, driving data generation means for repeatedly generating driving data for driving the plural LEDs by data written from said memory means, and driving means for independently driving the plural LEDs respectively according to the driving data, characterized in that it is constructed so that the data of the memory means can be set using e-mail.

20. An incoming notification pattern setting method of a portable telephone, characterized in that data of notification patterns and data of the tempo for generating patterns of a change in lighting colors by combinations of flashing of plural LEDs by respectively driving the plural LEDs with different colors every tempo are stored in memory means, and in driving data generation means, driving data for driving the plural LEDs by data written from said memory means is repeatedly generated, and in driving means, the plural LEDs respectively, are independently driven according to the driving data, and also the data of the memory means is set by downloading from a server.

21. An incoming notification pattern setting method of a portable telephone, characterized in that data of notification patterns and data of the tempo for generating patterns of a change in lighting colors by combinations of flashing of plural LEDs by respectively driving the plural LEDs with different colors every tempo are stored in memory means, and in driving data generation means, driving data for driving the plural LEDs by data written from said memory means is repeatedly generated, and in driving means, the plural LEDs respectively, are independently driven according to the driving data, and also the data of the memory means is set using e-mail.

\* \* \* \* \*